(12) United States Patent  
Santori et al.

(10) Patent No.: US 7,427,525 B2  
(45) Date of Patent: Sep. 23, 2008

(54) METHODS FOR COUPLING DIAMOND STRUCTURES TO PHOTONIC DEVICES

(75) Inventors: Charles Santori, Sunnyvale, CA (US); Sean Spillane, Mountain View, CA (US); Marco Fiorentino, Mountain View, CA (US); David Fattal, Mountain View, CA (US); Raymond G. Beausoleil, Redmond, WA (US); Wei Wu, Mountain View, CA (US); Theodore I. Kamins, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 13 days.

(21) Appl. No.: 11/580,344

(22) Filed: Oct. 13, 2006

(65) Prior Publication Data

US 2008/0096308 A1 Apr. 24, 2008

(51) Int. Cl.  
*H01L 21/00* (2006.01)
(52) U.S. Cl. .......................................... 438/31
(58) Field of Classification Search .................... 438/31  
See application file for complete search history.

(56) References Cited

U.S. PATENT DOCUMENTS

2007/0277730 A1* 12/2007 Rabeau et al. ................. 117/84  
2008/0063339 A1* 3/2008 Spillane et al. ............... 385/14

* cited by examiner

*Primary Examiner*—Thao X. Le  
*Assistant Examiner*—Kimberly Trice

(57) ABSTRACT

Various embodiments of the present invention are directed to methods for coupling semiconductor-based photonic devices to diamond. In one embodiment of the present invention, a method for coupling a photonic device with a diamond structure comprises embedding the diamond structure in a first substrate, where the first substrate comprises a first transparent material. The photonic device is formed in a semiconductor material, which is supported by a second substrate. An intermediate structure is formed by depositing a second transparent material over the photonic device. The second transparent material may have substantially the same refractive index as the first transparent material. The intermediate structure is then separated from the second substrate, and the intermediated structure is adhered to the first substrate so that the photonic device optically couples with the diamond structure.

13 Claims, 18 Drawing Sheets

METHODS FOR COUPLING DIAMOND STRUCTURES TO PHOTONIC DEVICES

TECHNICAL FIELD

The present invention relates to methods for fabricating photonic devices, and in particular, to methods for coupling diamond structures with photonic devices fabricated from semiconductor materials.

BACKGROUND OF THE INVENTION

Advancements in disciplines ranging from atomic physics to various branches of condensed matter physics are being employed to fabricate a variety of different diamond-based materials that can be used in many different technological applications. Diamond has a crystal lattice structure comprising two interpenetrating face-centered cubic lattices of carbon atoms. FIG. 1A shows a unit cell 100 of a diamond-crystal lattice. In FIG. 1A, each carbon atom, represented by a sphere, is covalently bonded to four adjacent carbon atoms, each covalent bond is represented by a rod connecting two spheres. As shown in FIG. 1A, a carbon atom 102 is covalently bonded to four carbon atoms 103-106. In general, diamond has a number of potentially useful properties. For example, diamond is transparent from the ultraviolet to the far infrared of the electromagnetic spectrum and has a relatively high refractive index of about 2.42. Diamond may also be a suitable replacement for silicon in silicon-based semiconductor devices. For example, silicon has an electronic bandgap of about 1.12 eV and starts to show signs of thermal stress at about 100° C., while diamond has a larger electronic bandgap ranging from about 5 eV to about 7 eV and a higher Debye temperature ranging from about 1550° C. to about 1930° C.

Certain impurities and defects, called "color centers," embedded in diamond may have potential applications in quantum computing and quantum information processing. For example, a nitrogen-vacancy ("NV") center embedded in diamond is a type of color center that may be used to store a quantum bit of information. FIG. 1B shows an NV center embedded in a diamond-crystal lattice 110. The NV-center comprises a nitrogen atom 112, substituted for a carbon atom, next to a vacancy 114 in the carbon lattice. The nitrogen atom 112 is covalently bonded to three carbon atoms 116-118. NV centers can be created in a nitrogen rich diamond by irradiation and subsequent annealing at temperatures above 550° C. The radiation creates vacancies in the diamond and subsequent annealing causes the vacancies to migrate towards nitrogen atoms to produce NV centers. Alternatively, NV centers can be created in diamond using $N^+$ ion implantation.

When an electromagnetic field interacts with an NV center, there is a periodic exchange, or oscillation, of energy between the electromagnetic field and the electronic energy levels of the NV center. Such oscillations, which are called "Rabi oscillations," are associated with oscillations of the NV center electronic energy level populations and quantum-mechanical probability amplitudes of the NV center electronic energy states. Rabi oscillations can be interpreted as an oscillation between absorption and stimulated emission of photons. The Rabi frequency, denoted by $\Omega$, represents the number of times these oscillations occur per unit time (multiplied by the quantity $2\pi$).

FIG. 1C illustrates an energy-level diagram of electronic states of a negatively charged NV center. Under applied stress or an electric field, the E3 excited states, which have an optical doublet, spin striplet structure, split into upper and lower branches with different orbital states. Only the lower branch of the excited states, consisting of three spin levels, is shown in the FIG. 1C. Normally, the optical transitions are normally spin converging. However, when the orbital splitting induced by the applied stress or electric field is in a range from about 15 GHz to about 45 GHz, the spin-orbit interaction can mix the excited states so that spin-non-conserving transitions become allowed In this case, it may be possible to obtain A-type configuration comprising multiple ground states coupled to a common excited state. The three ground $^3A_2$ states comprise a first ground state $|1\rangle$ with a lowest energy level 122, and a pair of nearly degenerate ground states $|2\rangle$ and $|3\rangle$ with energy levels 124 and 126, respectively. In FIG. 1C, all three ground states are coupled to an excited state 128, labeled $|4\rangle$. The three double-headed directional arrows 130-132, corresponds to optical transitions driven by two laser frequencies. A first laser drives the $|1\rangle\rightarrow|4\rangle$ transition, while a second laser drives both the $|2\rangle\rightarrow|4\rangle$ and the $|3\rangle\rightarrow|4\rangle$ transitions. A parameter $\delta_1$ represents the laser frequency detuning for a $|1\rangle\rightarrow|4\rangle$ transition, a parameter $\delta_2$ is the laser frequency detuning for a $|2\rangle\rightarrow|4\rangle$ transition, a parameter $\delta_{23}$ is the $|2\rangle\leftrightarrow|3\rangle$ energy splitting, and $\Omega_i$ represent Rabi frequencies, which are proportional to the square root of the laser intensities. When $\delta_1=\delta_2$ or $\delta_1=\delta_2+\delta_3$, the system will relax through spontaneous emission into stable "dark" states, which are linear combinations of the states $|1\rangle$, $|2\rangle$, and $|3\rangle$, with probability amplitudes that are tunable through the laser amplitudes. These dark resonance states can be used, for example, for all-optical manipulation of the electron spin. For a description of experimental investigations of NV centers, see "The nitrogen-vacancy center in diamond re-visted," by N. B. Manson et al., preprint: http://arxiv.org/abs/cond-mat/0601360; "Coherent population trapping with a single spin in diamond," by Charles Santori et al., preprint: http://arxiv.org/abs/quant-ph/0607147; and "Coherent population trapping in Diamond N-V centers at zero magnetic field," by Charles Santori et al., preprint: http://arxiv.org/abs/cond-mat/0602573. Note that the exact structure of the $^3E$ state depends on the strain or other mechanical effects exterted on the diamond crystal. Also, the excited-state linewidths depend critically on the temperature. In order to obtain optical linewidths that are less than 100 MHz, it is necessary to lower the temperature of the diamond crystal to temperatures below 20K. With narrow optical linewidths, it is possible to manipulate the spins of single NV centers using the optical transitions shown in FIG. 1C.

The NV centers are appealing for quantum information processing because the NV center has a relatively long-lived spin coherence time and a possibility of large-scale integration into semiconductor processing technology. For example, an NV center electron spin coherence time of 58 μs has been observed at room temperature. See "Long coherence times at 300K for nitrogen-vacancy center spins in diamond grown by chemical vapor deposition," by A. Kennedy et al., *App. Phys. Lett.* 83, 4190-4192 (2003). NV centers may have relatively long-lived spin coherence because the lattice comprises primarily $^{12}C$, which has zero nuclear spin. In addition, a single photon can be generated from an NV center at room temperature, which has established NV centers as potential photon sources for quantum cryptography. See "Stable solid-state source of single photons," by C. Kurtsiefer et al., *Phys. Rev. Lett.* 85, 290-293 (2000) and "Room temperature stable single photon source," by A. Beveratos et al., *Eur. Phys. J. D* 18, 191-196 (2002).

However, in order to fully realize the potential of diamond color centers for photonic quantum information processing it is necessary to optically couple the diamond color centers to photonic devices, such as resonant cavities and waveguides, which can be used to transmit quantum information encoded in modes of electromagnetic radiation. The photonic devices can be formed in semiconductor materials and used as components of quantum computer architectures. When the coupling between the color center and the cavity or waveguide is sufficiently strong, efficient inter-conversion between photonic and spin qubits becomes possible. One can then envision connecting many such devices together by employing optical waveguides to realize a scalable quantum computing architecture. Physicists, computer scientists, and engineers have, therefore, recognized a need for methods of optically coupling diamond with photonic devices in order to fabricate various quantum computing architectures.

SUMMARY OF THE INVENTION

Various embodiments of the present invention are directed to methods for coupling semiconductor-based photonic devices to diamond structures. In one embodiment of the present invention, a method for coupling a photonic device with a diamond structure comprises embedding the diamond structure in a first substrate, where the first substrate comprises a first transparent material. The photonic device is formed in a semiconductor material, which is supported by a second substrate. An intermediate structure is formed by depositing a second transparent material over the photonic device. The second transparent material may have substantially the same refractive index as the first transparent material. The intermediate structure is then separated from the second substrate, and the intermediated structure is adhered to the first substrate so that the photonic device optically couples with the diamond structure.

DETAILED DESCRIPTION OF THE INVENTION

Various embodiments of the present invention are directed to methods for coupling semiconductor-based photonic devices to diamond structures. The semiconductor-based photonic devices may be ridge waveguides, microrings, microdisks, photonic-crystal waveguides, and photonic-crystal resonant cavities, or any other device that can be optically coupled to a diamond structure and is suitable for transmitting one or more modes of electromagnetic radiation. The diamond structures may include one or more color centers. The color centers may all be identical, where the color-center may be of several varieties formed from N, Ni, Si, or other impurities which produce color centers with narrow-linewidth optical transition similar to those observed in the zero-phonon lines of the NV center described above. For the sake of brevity and simplicity, various method embodiments of the present invention are described below with reference to optically coupling a single microring to a diamond structure having a single color center.

Figure 2A:
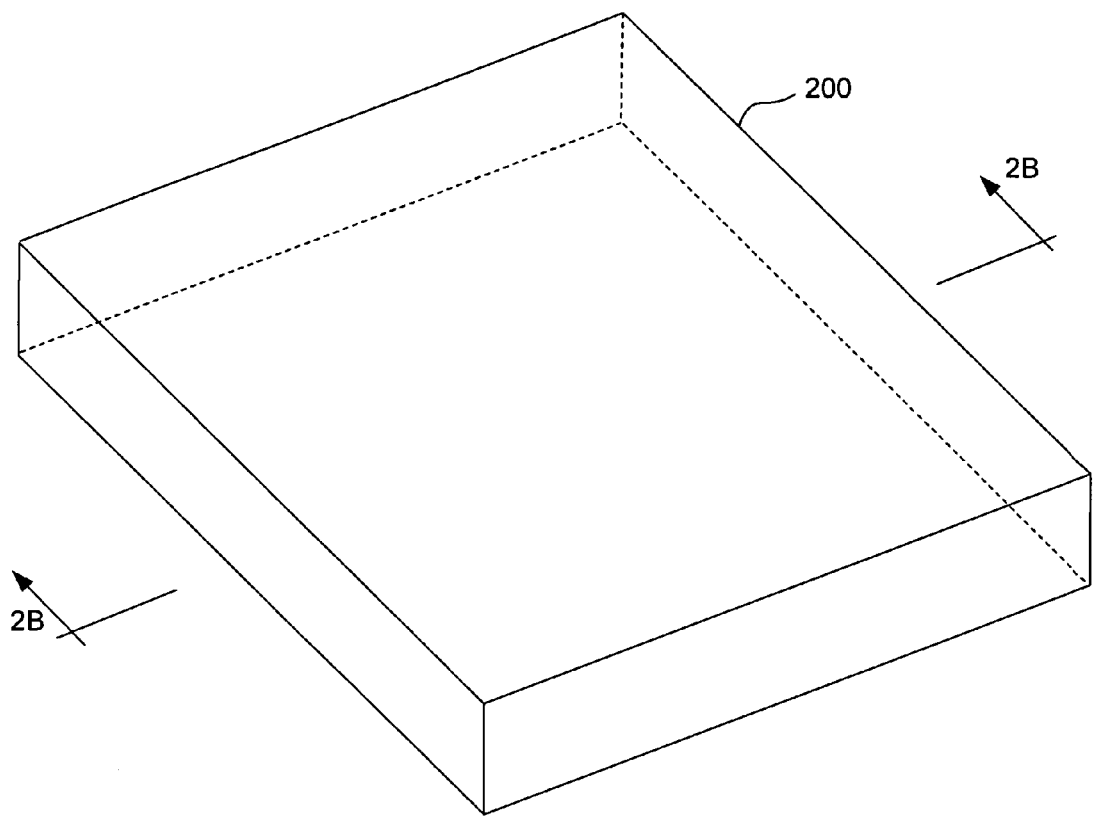
FIGS. 2A-2B illustrate a first substrate for supporting a diamond structure that represents an embodiment of the present invention.
Figure 2B:
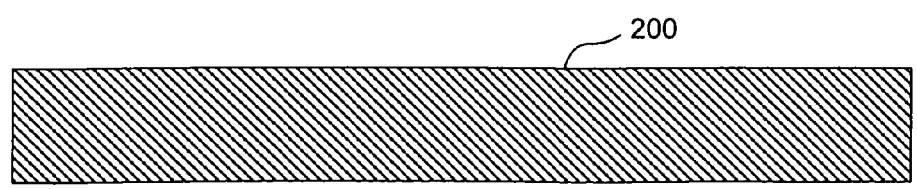

A first method embodiment of the present invention is described below with reference to FIGS. 2-10. FIG. 2A illustrates a perspective view of a first substrate 200 for supporting a diamond structure that represents an embodiment of the present invention. The first substrate 200 may be a rigid transparent material with a lower index of refraction of the material to be used for the resonator and waveguide structures described below. For example, the first substrate 200 can be silicon dioxide ("SiO$_2$"), silicon carbide ("SiC"), an acrylate polymer, or any other transparent polymer material having a lower index of refraction than diamond. The first substrate 200 can be formed using one of many well-known chemical vapor deposition ("CVD") techniques or one of many well-known epitaxial growth techniques, such as molecular beam expitaxy ("MBE"). FIG. 2B illustrates a cross-sectional view of the first substrate 200 that represents an embodiment of the present invention.

Figure 3A:
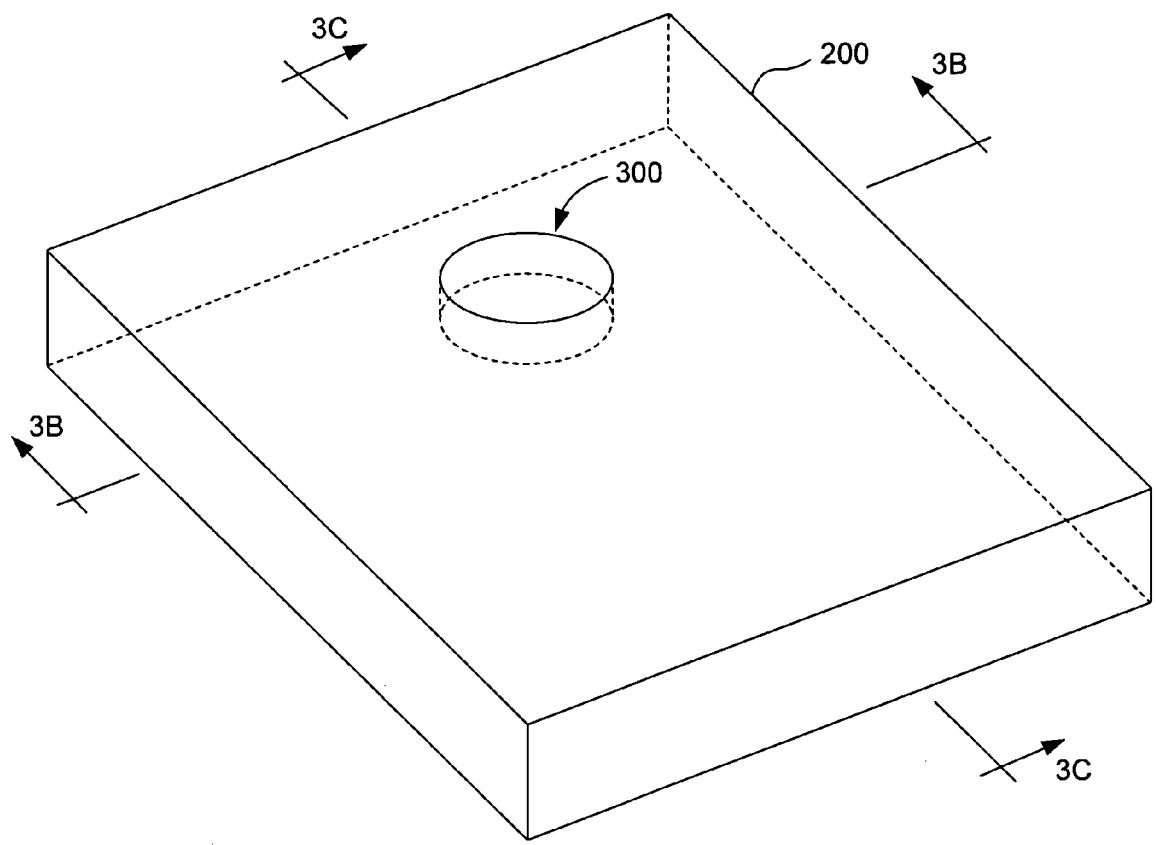
FIGS. 3A-3C illustrate the first substrate shown in FIGS. 2A-2B with a hole for retaining a diamond structure that represents an embodiment of the present invention.
Figure 3B:
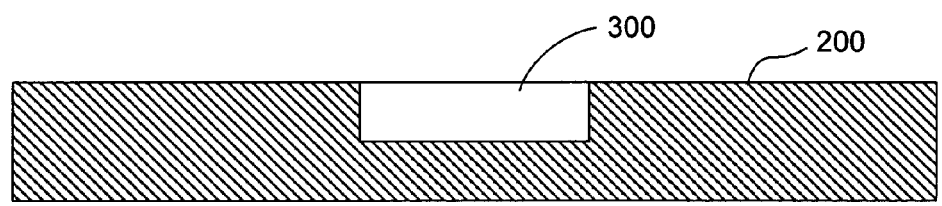
Figure 3C:
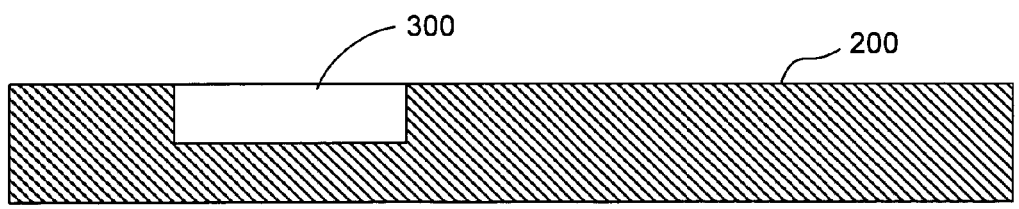

Next, a hole for retaining a diamond structure is formed in the first substrate 200. FIG. 3A illustrates a perspective view of the first substrate 200 with a hole 300 for retaining a diamond structure that represents an embodiment of the present invention. The hole 300 may be formed in the first substrate 200 using one of many different etching techniques that are well-known in the art. For example, the hole 300 can be formed using reactive-ion etching ("RIE"), focused ion-beam etching, or chemically assisted ion-beam etching. The hole 300 can also be formed in the substrate 200 using one of many different lithographic techniques that are well-know in the art. For example, the hole 300 can formed using electron beam lithography, photolithography, or nanoimprint lithography. The hole 300 extends an intermediate distance into the first substrate 200 and is positioned so that a diamond structure retained in the hole 300 can be coupled with a photonic device. FIGS. 3B and 3C illustrate two different cross-sectional views of the hole 300 in the first substrate 200 shown in FIG. 3A that represents an embodiment of the present invention. As shown in both FIGS. 3B and 3C, the hole 300 extends only part way through the first substrate 200. Although the hole 300, shown in FIGS. 3A-3C, is circular, the present invention is not limited to circular holes for retaining diamond structures. In alternate embodiments of the present invention, the hole 300 can be elliptical, square, rectangular, triangular, tetrahedral, rhomboidal, or an irregular shape.

Figure 4A:
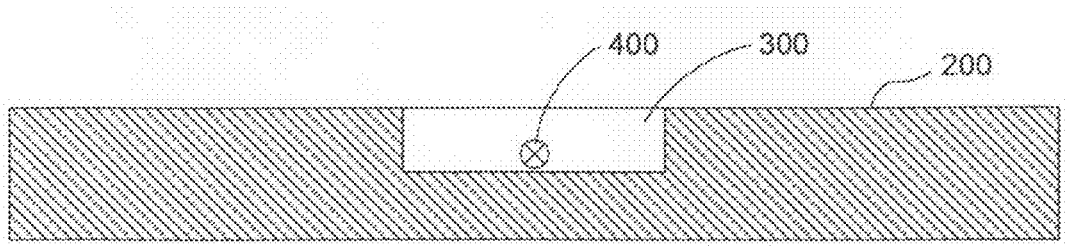
FIGS. 4A-4C illustrate cross-sectional views of forming a diamond structure in the hole shown in FIGS. 3A-3C that represents an embodiment of the present invention.
Figure 4B:
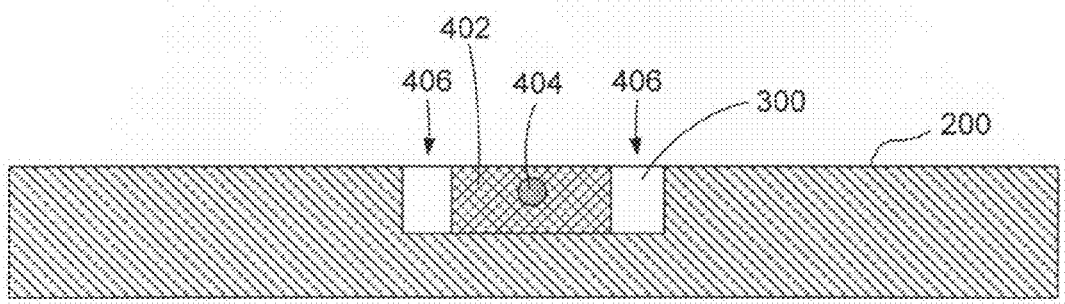
Figure 4C:
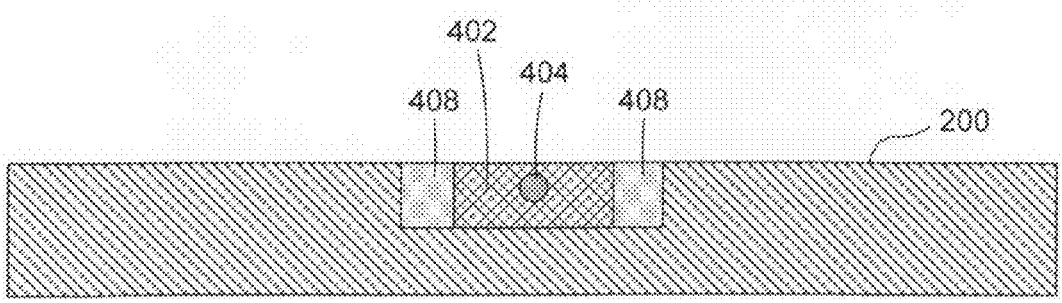

Next, a diamond structure may be formed in the hole 300. FIGS. 4A-4C illustrate cross-sectional views of forming a diamond structure in the hole 300 shown in FIG. 3B that represents an embodiment of the present invention. As shown in FIG. 4A, a nucleation center 400 is first deposited in the hole 300 using semiconductor fabrication techniques, such as lithography, evaporation, deposition, and liftoff. The nucleation center 400 can be Ni, Pt, a diamond seed crystal with or without a color center, or another seed material. Lithography, evaporation, deposition, and liftoff are well-known techniques in the art for depositing atoms and seed crystals at specific locations of a substrate surface. Next, as shown in FIG. 4B, a diamond structure 402 with a color center 404 is formed at the nucleation center 400 using CVD. In an alternate embodiment of the present invention, the diamond structure 402 can be formed separately and deposited in the hole 300. The diamond structure 402 may vary in size from 20 nm to several millimeters. Note that the diamond structure 402, shown in FIG. 4B, is formed with a space 406 between the diamond structure 402 and the side walls of the hole 300. In alternate embodiments of the present invention, in order to control strain of the diamond structure during operation, a metal 408, or other material, can be deposited in the space 406 between the diamond structure 402 and the sidewalls of the hole 300. The material 408 may be selected based on the material's 408 thermal expansion properties so that when the device is cooled to cryogenic temperatures, strain will be induced inside the diamond modifying the excited-state structure of the color center 404.

Figure 5A:
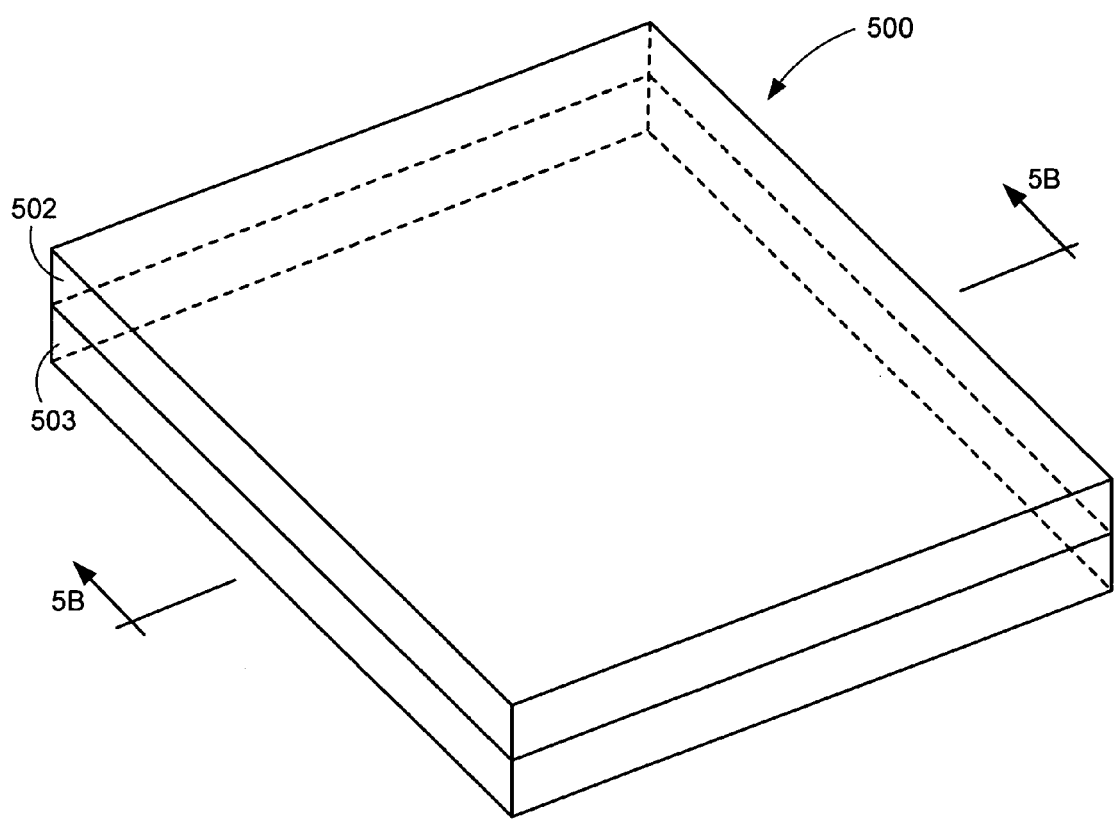
FIGS. 5A-5B illustrate a second substrate that represents an embodiment of the present invention.
Figure 5B:
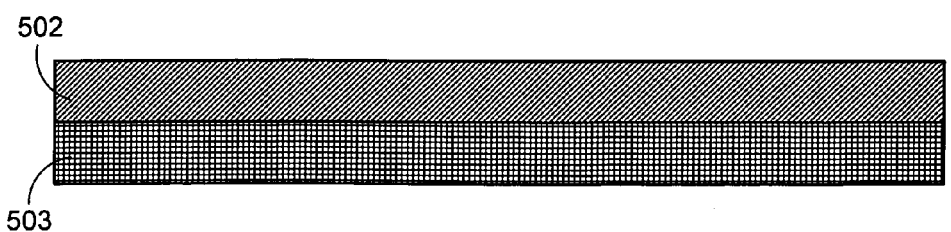

A second part of the first method of the present invention relates to embedding a photonic device in an intermediate substrate. FIG. 5A illustrates a perspective view of a second substrate 500 that represents an embodiment of the present invention. FIG. 5B illustrates a cross-sectional view of the second substrate 500 that represents an embodiment of the present invention. As shown in FIGS. 5A-5B, the second substrate 500 comprises two semiconductor layers 502-503. The top layer 502 and the bottom layer 503 are comprised of a III-V, a II-VI, a Group IV semiconductor or a high refractive index dielectric. The Roman numerals II, III, IV, V, and VI refer to the Group Two, Group Three, Group Four, Group Five, and Group Six elements of the Periodic Table of Elements, respectively. For example, the top layer 502 can both be a III-V semiconductor, such as GaP, which comprises equal quantities of Ga, a Group Three element, and P, a Group Five element. On the other hand, the bottom layer 503 can be comprised of a quantity of two or more different Group Two elements and an equal quantity of two or more different Group Six elements, or a quantity of two or more different Group Three elements and an equal quantity of two or more different Group Five elements. For example, the bottom layer 503 can be AlGaP, which is comprised of a quantity of Al and Ga, both Group Three elements, and an equal quantity of P, a Group Five element. The semiconductor layers 502-503 can be formed using well-known CVD or MBE techniques described above with reference to FIG. 2.

Figure 6A:
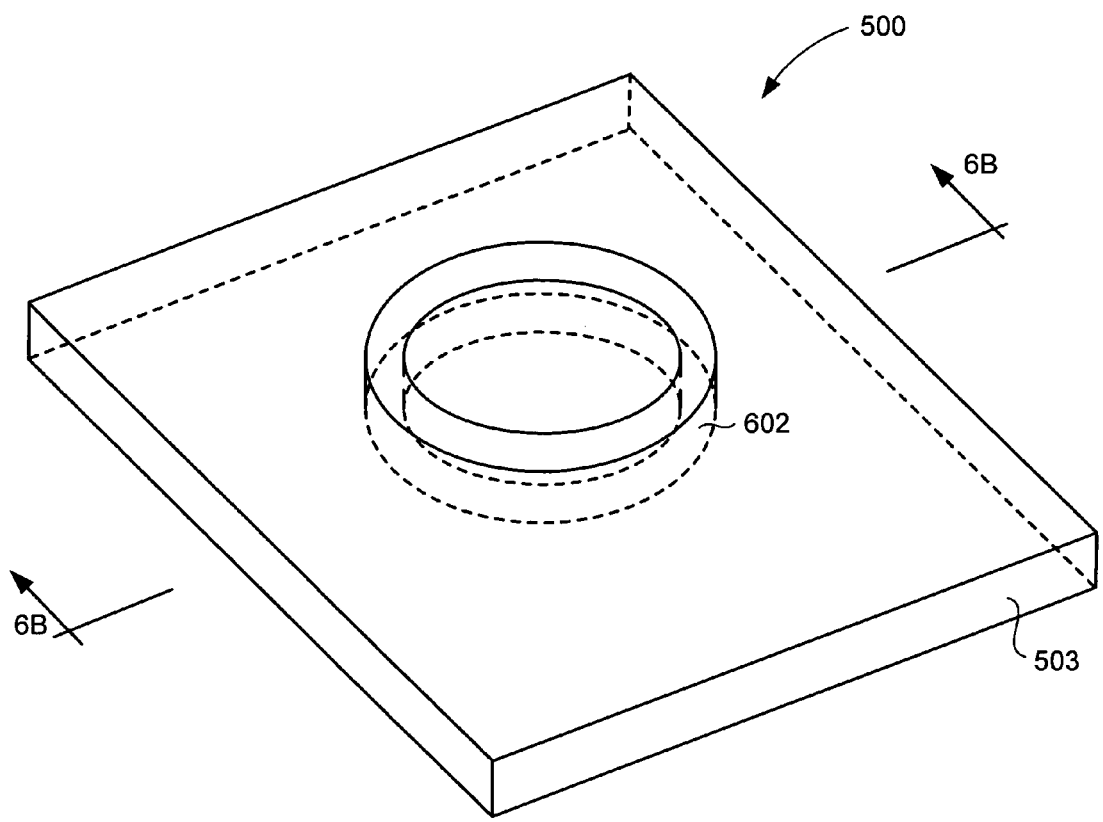
FIGS. 6A-6B illustrate the second substrate shown in FIGS. 5A-5B after forming a microring in a layer of the second substrate that represents an embodiment of the present invention.
Figure 6B:
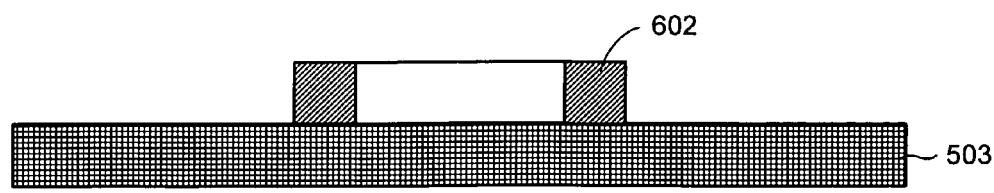

FIG. 6A illustrates a perspective view of the second substrate 500, shown in FIG. 5A, after formation of a microring 602 in the top layer 502 that represents an embodiment of the present invention. The microring 602 may be formed using one of the well-known lithographic and/or etching techniques described above with reference to FIG. 3. FIG. 6B illustrates a cross-sectional view of the microring 602 located on the bottom layer 503. As shown in FIG. 6B, in forming the microring 602, the top surface of the bottom layer 503 may be exposed by removing all of the material comprising the top layer 502 except for the portion defining the microring 602.

Figure 7A:
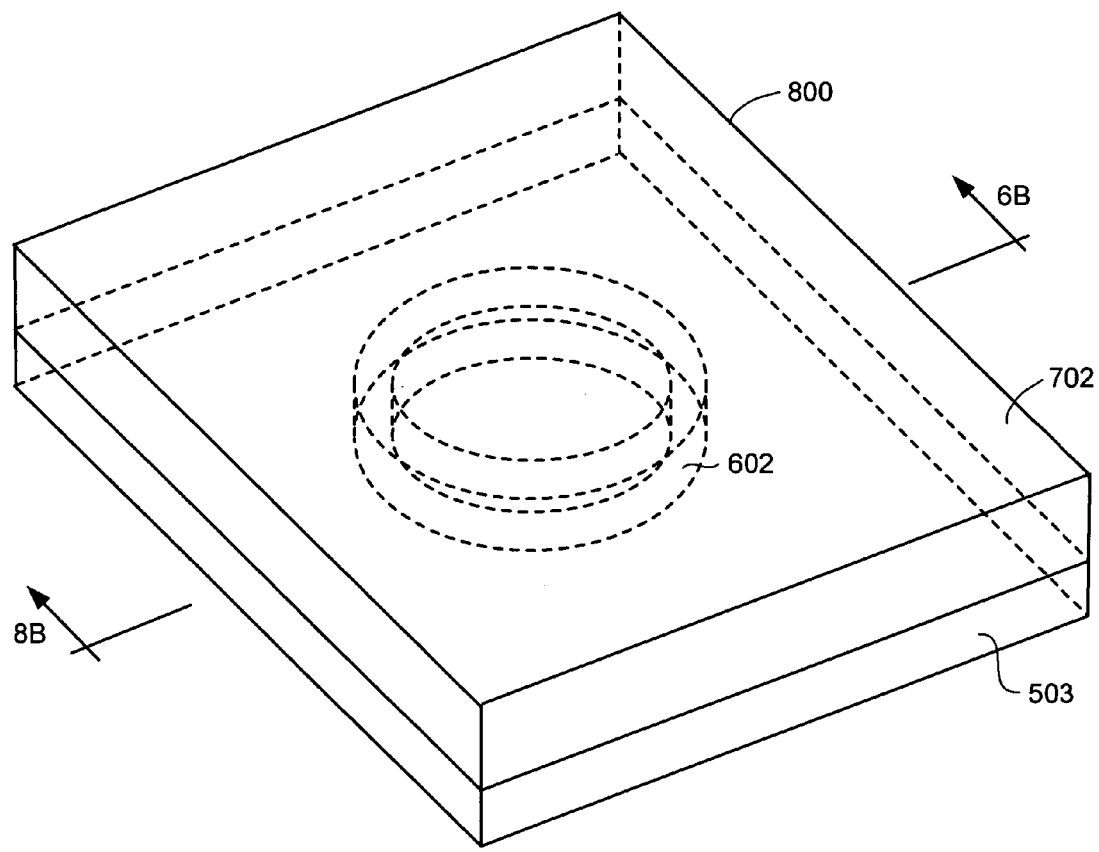
FIGS. 7A-7B illustrate a transparent material deposited over the microring shown in FIGS. 6A-6B that represents an embodiment of the present invention.
Figure 7B:
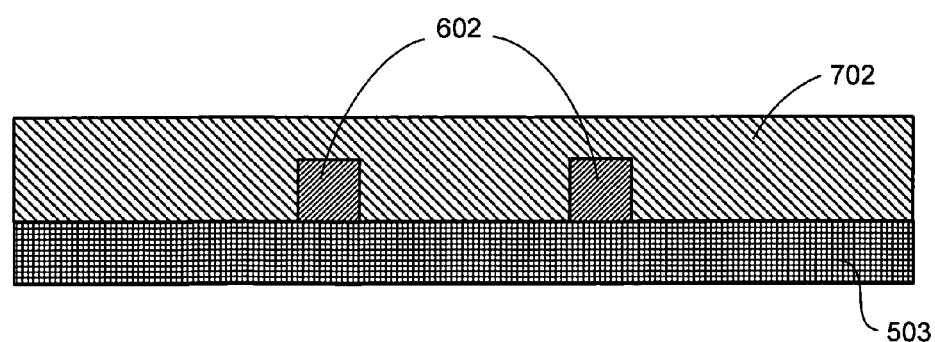

Next, a second transparent material may be deposited over the exposed portions of the second substrate 500 shown in FIG. 6. FIG. 7A illustrates a perspective view of a second transparent material 702 deposited over the microring 602 and the top surface of the intermediate layer 502 that represents an embodiment of the present invention. The second transparent material can be SiN, $SiO_2$, SiC, an acrylate polymer, or any other transparent polymer material having a lower index of refraction than the semiconductor material used to form the microring 602. The second transparent material can be deposited using any one of the many well-known, thin-film deposition techniques. FIG. 7B illustrates a cross-sectional view of the second substrate 500 shown in FIG. 7A that represents an embodiment of the present invention. As shown in FIG. 7B, the transparent material 702 covers the top and side surfaces of the microring 602.

Figure 8A:
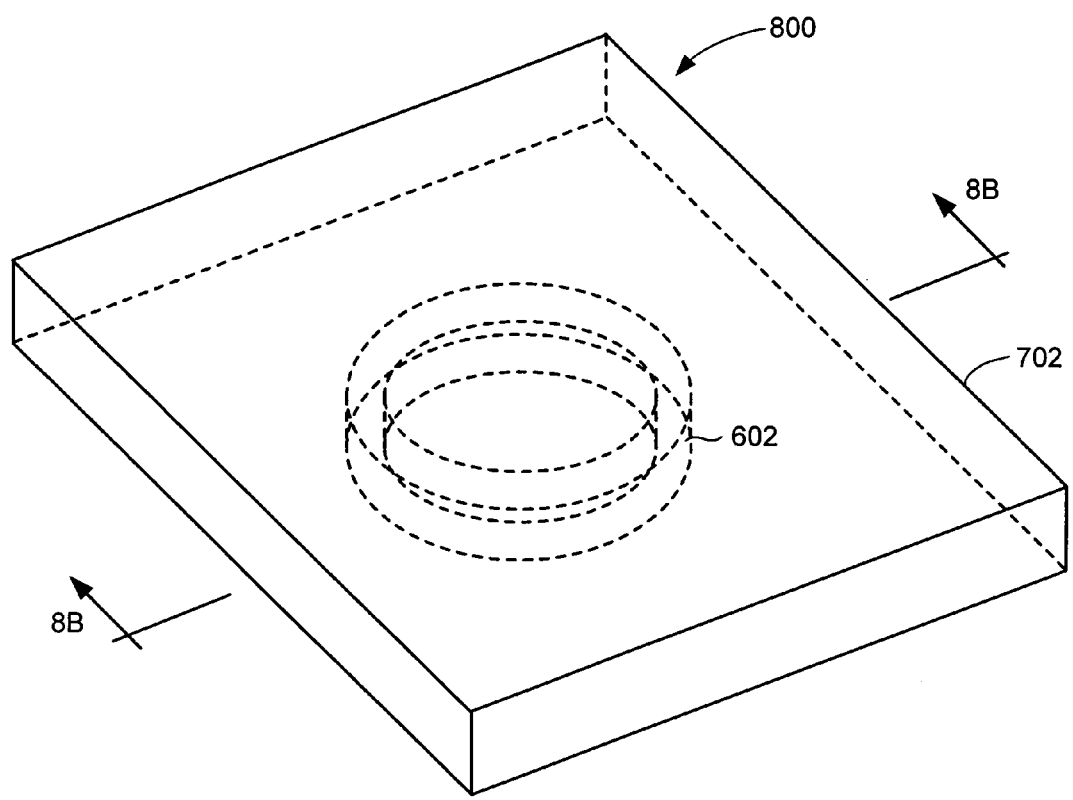
FIGS. 8A-8B illustrate an intermediate structure that represents an embodiment of the present invention.
Figure 8B:
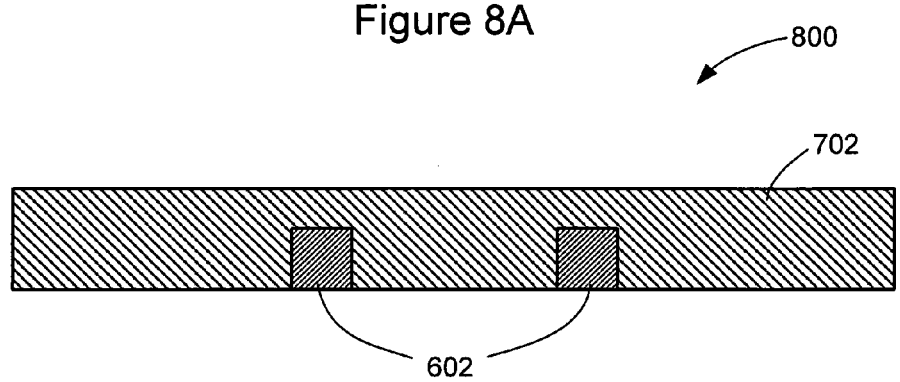

The bottom layer 503 of the second substrate 500 may be removed leaving an intermediate structure comprising the microring 602 embedded in the second transparent material 702. The bottom layer 503 can be removed using any one of the well-known etching and/or lithographic techniques described above. FIG. 8A illustrates a perspective view of an intermediate structure 800 that represents an embodiment of the present invention. The intermediate structure 800 comprises the microring 602 embedded in the second transparent material 702. FIG. 8B illustrates a cross-sectional view of the intermediate structure 800 shown in FIG. 8A that represents an embodiment of the present invention. As shown in FIG. 8B, removing the bottom layer 503 exposes the bottom surface of the microring 602.

Figure 9:
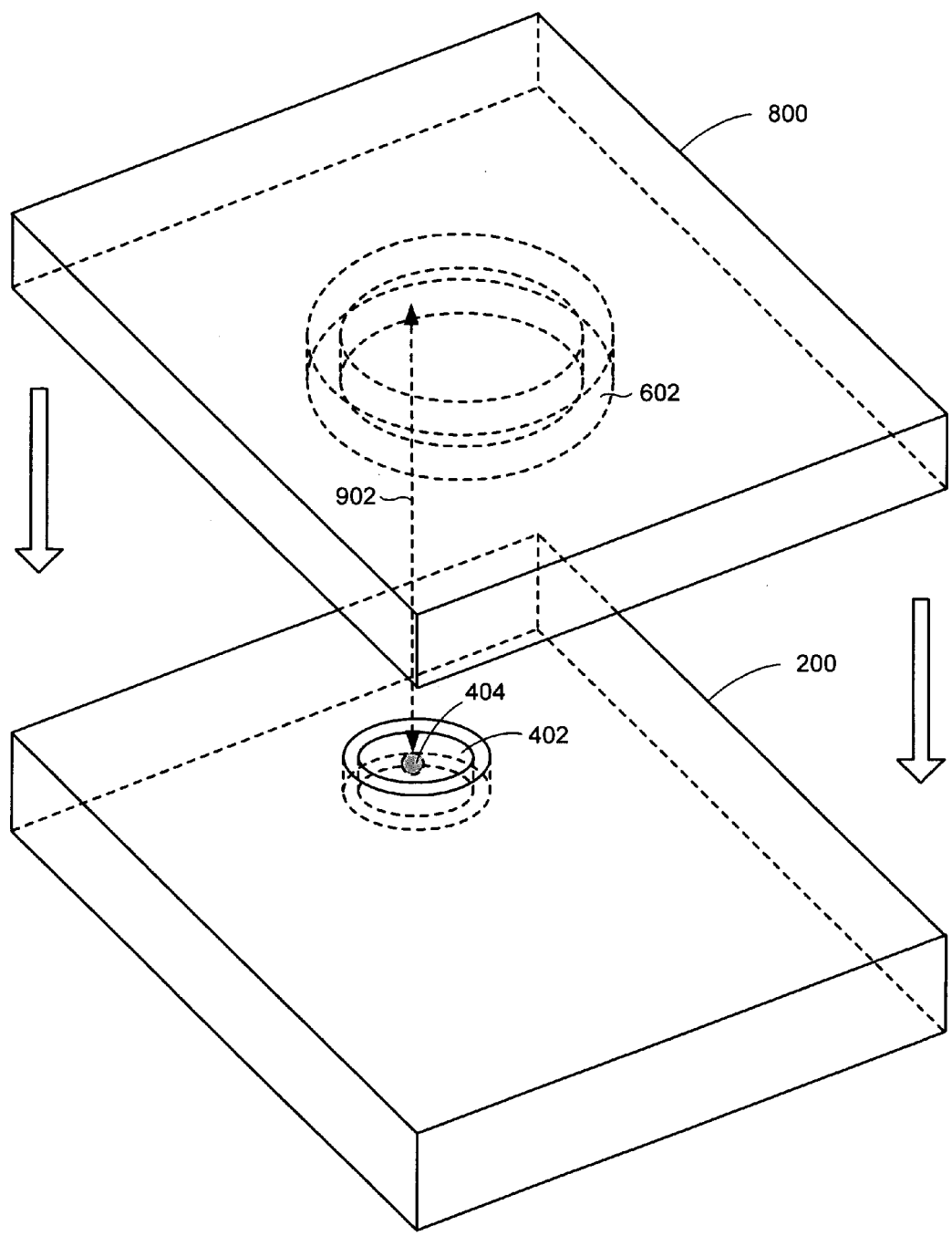
FIG. 9 illustrates placing the intermediate structure shown in FIG. 8 adjacent to the first substrate shown in FIG. 4C that represents an embodiment of the present invention.

Next, the bottom surface of the intermediate structure 800, shown in FIG. 8, is adhered to the top surface of the first substrate 200, shown in FIG. 4C, so that the diamond structure 402 can be optically coupled to the microring 602. FIG. 9 illustrates placing the intermediate structure 800 adjacent to the top surface of the first substrate 200 that represents an embodiment of the present invention. Double-headed arrow 902 indicates that as the bottom surface of the intermediate structure 800 is lowered next to the top surface of the first substrate 902, the color center 404 is located below a portion of the microring 602. The first substrate 200 and the intermediate structure 800 can be adhered together in a number of different ways. For example, in an alternate embodiment of the present invention, a transparent adhesive, such as a transparent glue or epoxy, can be applied to the top surface of the first substrate 200 and the bottom surface of the intermediate substrate 800 and the two surfaces joined together. In an alternate embodiment of the present invention, when the transparent material comprising the first substrate 200 is identical to the transparent material comprising the intermediate structure 800 and the adjacent surfaces are free of dust or particulates, the transparent materials of the first substrate 200 and the intermediate structure 800 fuse to form a single transparent material. In alternate embodiments of the present invention, the first substrate 200 and the intermediate substrate 800 can be joined using well-known wafer bonding techniques. In an alternate embodiment of the present invention, the first substrate 200 and the intermediate structure 800 can be held together with a clamp or grasping device (not shown).

Figure 10A:
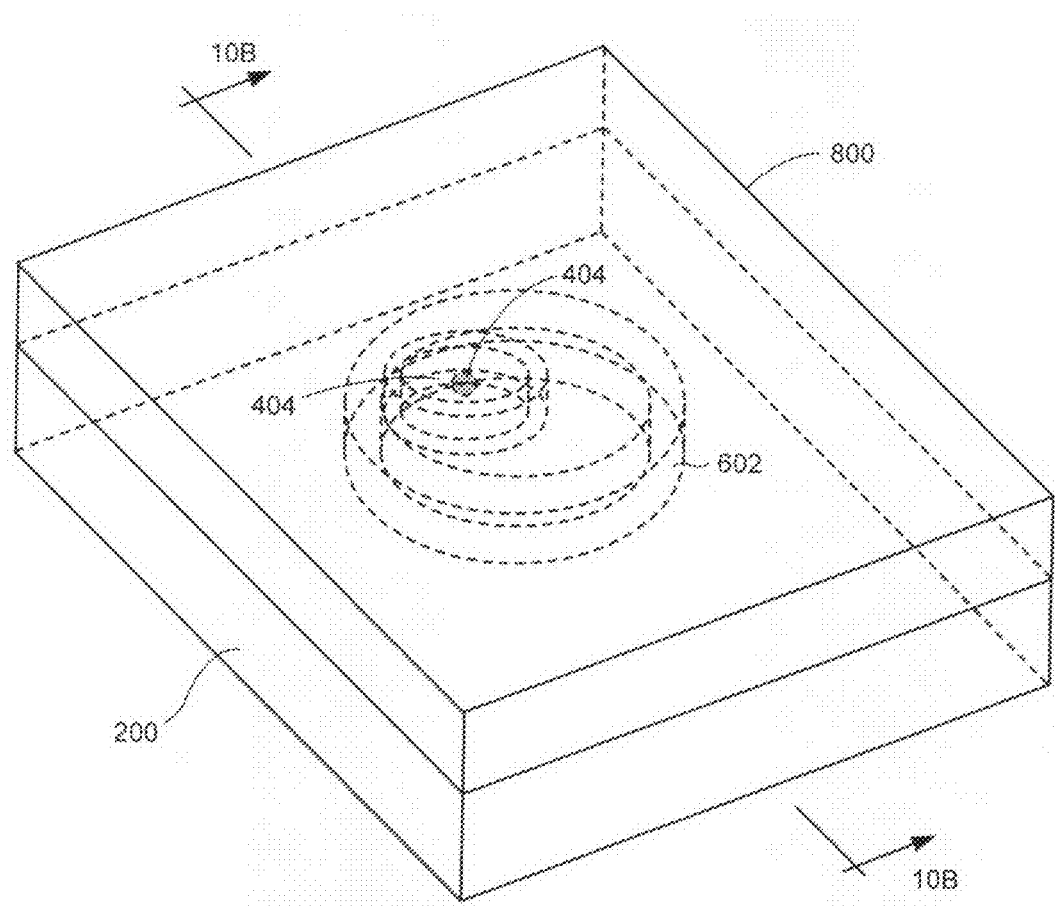
FIGS. 10A-10B illustrate the intermediate structure shown in FIG. 8 adhered to the first substrate shown in FIG. 9 that represents an embodiment of the present invention.
Figure 10B:
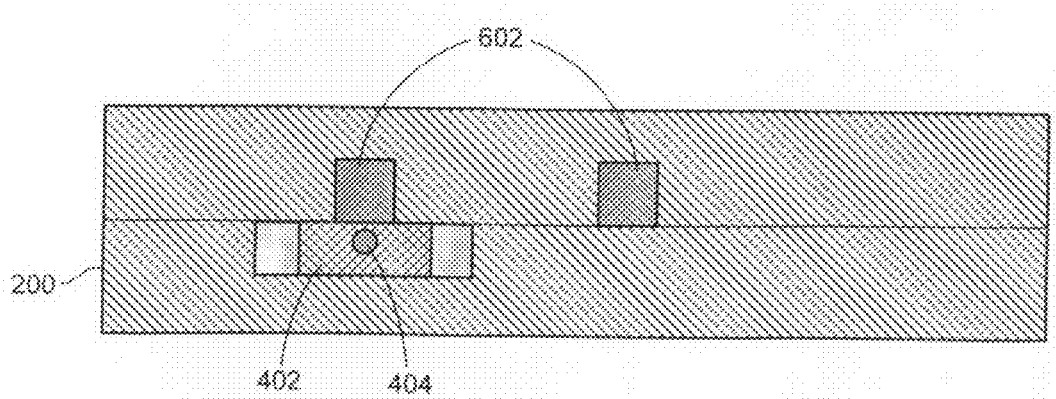

FIG. 10A illustrates a perspective view of the intermediate structure 800 adhered to the first substrate 200 that represents an embodiment of the present invention. As shown in FIG. 10A, the intermediate structure 800 rests on the top surface of the first substrate 200 so that a portion of the microring 602 can be located adjacent to the diamond structure 402. FIG. 10B illustrates a cross-sectional view of the intermediate structure 800 adhered to the first substrate 200, shown in FIG. 8A, that represents an embodiment of the present invention. By positioning the microring 602 near the color center 404, as shown in FIG. 10B, the microring 602 and the color center 404 are optically coupled. In other words, electromagnetic radiation can be transferred back and forth between the microring 602 and the color center 404.

Note that in alternate embodiments of the present invention, the dimensions of the diamond may be considerably larger than the microring dimensions. For example, a diamond structure of about 0.5 square millimeters may be coupled with a large number of microrings with diameters of about 10 microns.

Although the methods for depositing a diamond structure in the first substrate were described first with reference to FIGS. 2-4, and the methods for forming the microring in the semiconductor were described second with reference to FIGS. 5-10, these two parts of the first method embodiments can be performed independent of one another. In other words, the order in which the first part described with reference to FIGS. 2-4 and the second part described above with reference to FIGS. 5-10 is arbitrary.

Figure 11A:
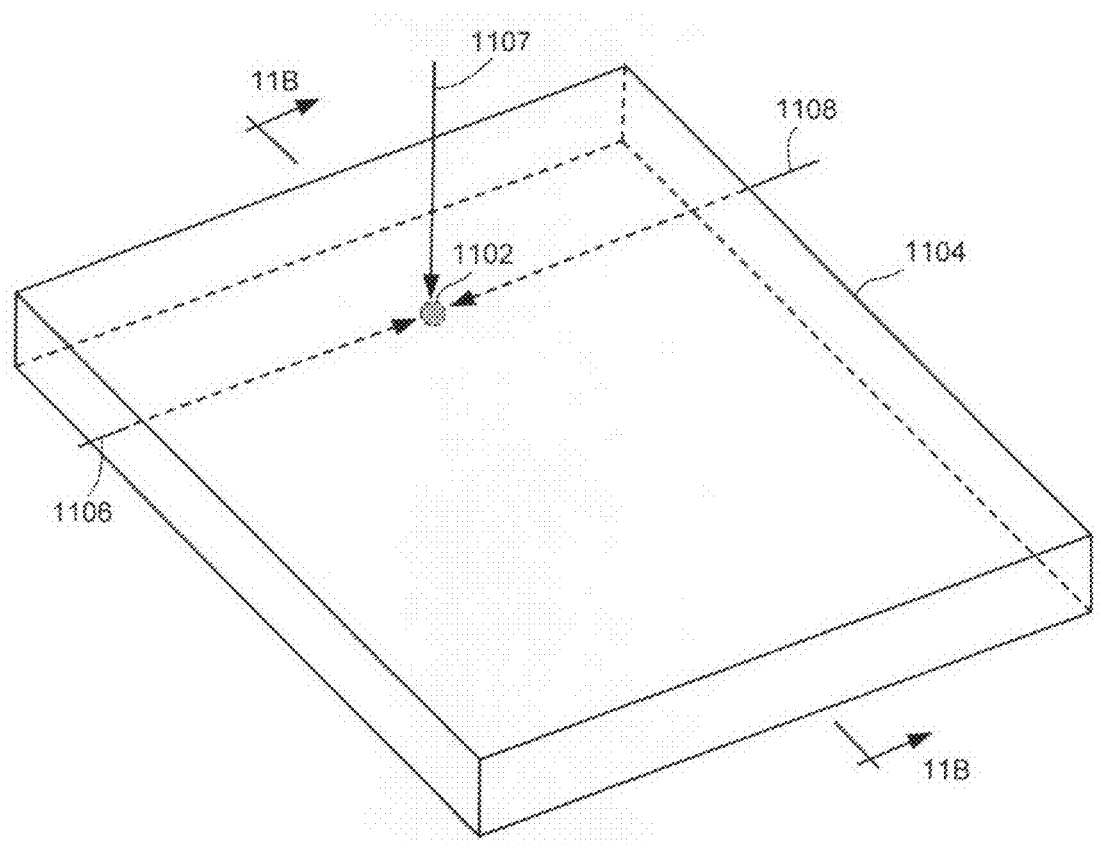
FIGS. 11A-11B illustrate a color center embedded in a diamond structure that represents an embodiment of the present invention.
Figure 11B:
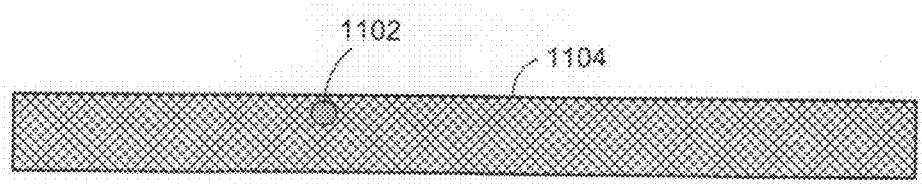

A second method embodiment of the present invention is described below with reference to FIGS. 11-13. First, a diamond structure containing an arrangement of color centers may be fabricated using lithography and implantation. Color centers can be embedded in the diamond structure at pre-defined locations using a lithographically-defined mask and ion implantation. Fabricating the lithographically-defined mask and use of ion implantation to place the color-centers at the predefined locations of the diamond structure are well-known methods in the art. See e.g., A. Greentree et al., *J. Phys.: Condens. Matter* 18, S825 (2006). FIG. 11A illustrates a perspective view of a color center 1102 embedded at a predefined location in a diamond structure 1104 that represents an embodiment of the present invention. Directional arrows 1106-1108 indicate that the color center is located just below the top surface of the diamond structure 1104. FIG. 11B illustrates a cross-sectional view of the color center 1102 embedded in the diamond structure 1104 that represents an embodiment of the present invention.

Figure 12A:
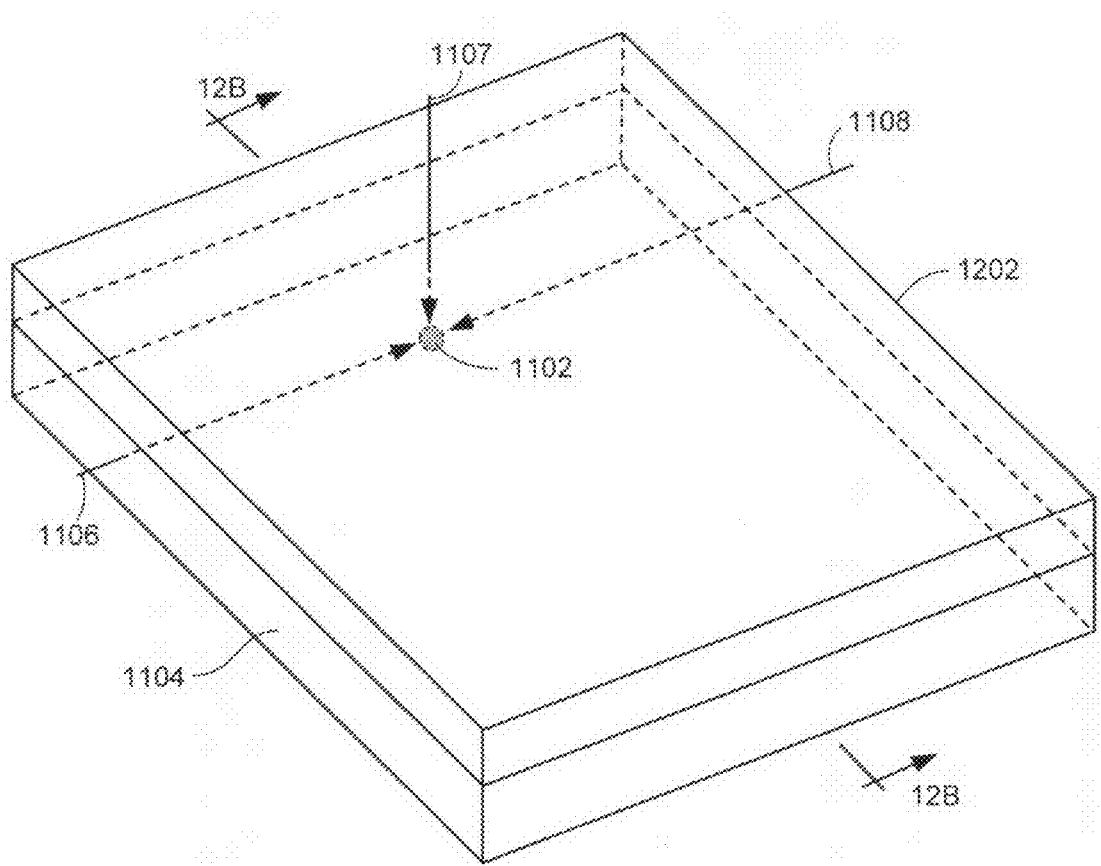
FIGS. 12A-12B illustrate a transmission layer deposited on the top surface of the diamond structure shown in FIGS. 11A-11B that represents an embodiment of the present invention.
Figure 12B:
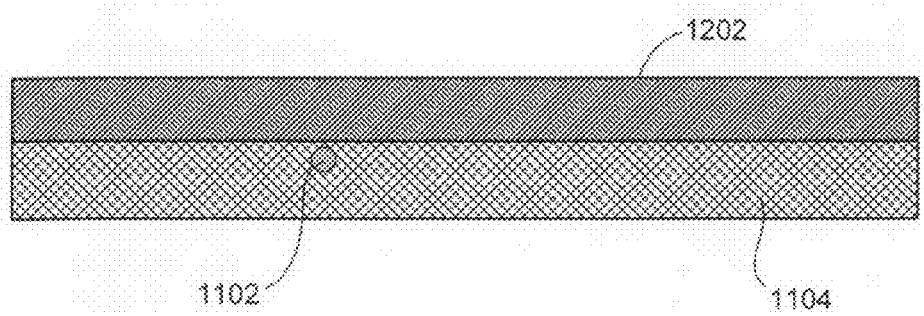

Next, a transmission layer comprising a II-VI, a III-V, a Group IV semiconductor or high refractive index dielectric is deposited on the top surface of the diamond structure 1104. Note that in alternate embodiments of the present invention, the transmission layer can be deposited using CVD or MBE, or the transmission layer can be prefabricated and bonded to the diamond structure using wafer bonding, which is a well-known technique in the art for bonding two surfaces together. FIG. 12A illustrates a perspective view of a transmission layer 1202 deposited on the top surface of the diamond structure 1104 that represents an embodiment of the present invention. FIG. 12B illustrates a cross-sectional view of the diamond structure 1104 and the transmission layer 1202 that represents an embodiment of the present invention.

Figure 13A:
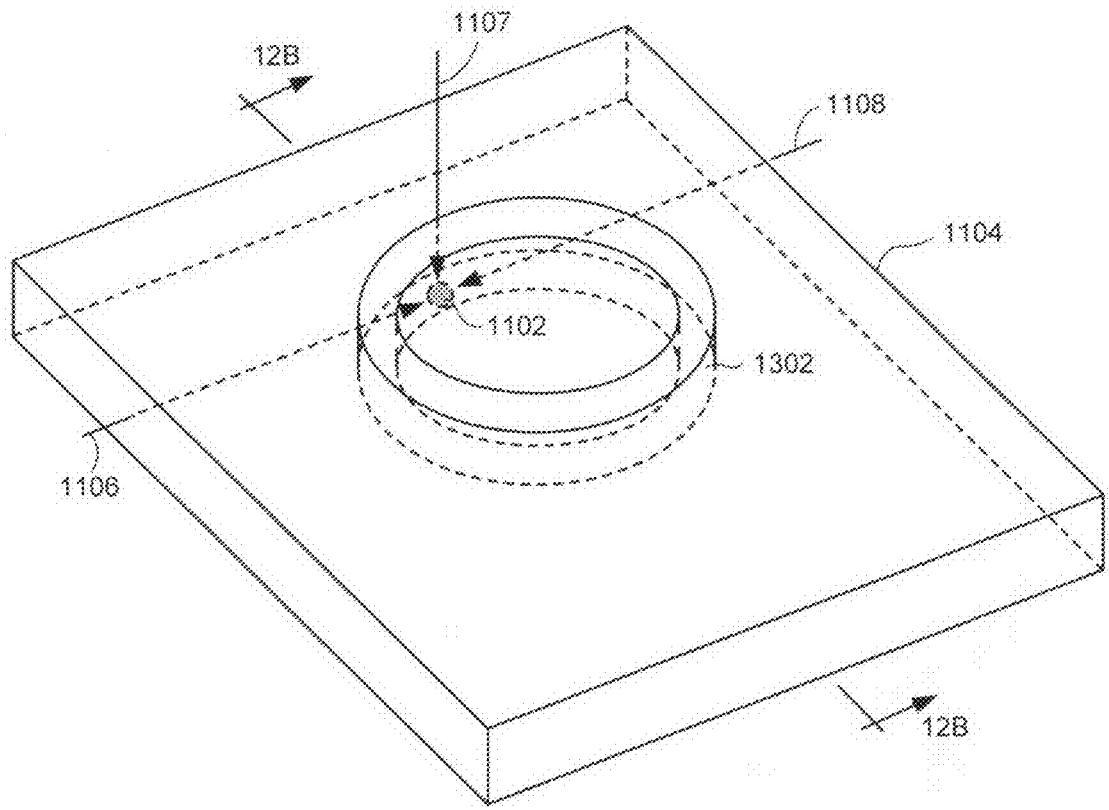
FIGS. 13A-13B illustrates a microring patterned in the transmission layer shown in FIG. 12 that represents an embodiment of the present invention.
Figure 13B:
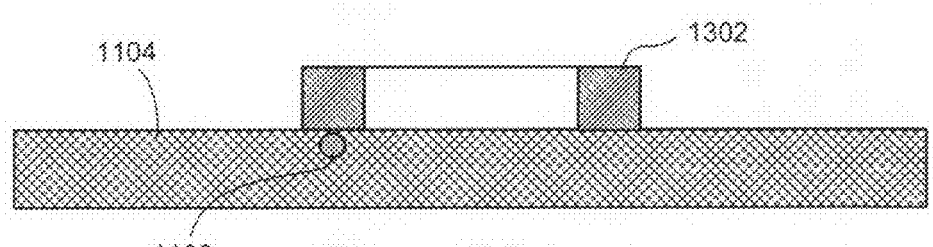

Next, RIE, lithography, and/or nanoimprint lithography can be used to a form a microring in the transmission layer 1202. FIG. 13A illustrates a perspective view of a microring 1302 patterned in the transmission layer 1202 that represents an embodiment of the present invention. As shown in FIG. 13A, the microring 1302 is formed in the transmission layer 1202 so that a portion of the microring 1302 is adjacent to the color center 1102, which results in optical coupling of the microring 1302 and the color center 1102. FIG. 13B illustrates a cross-sectional view of the color center 1102 located directly beneath a portion of the microring 1302 that represents an embodiment of the present invention.

Figure 14:
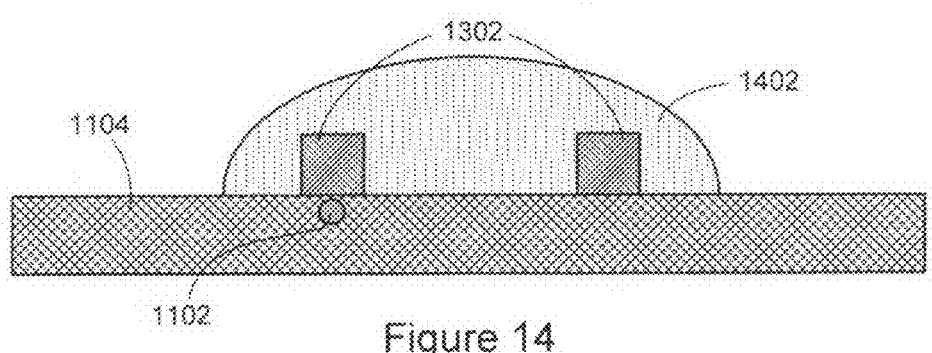
FIG. 14 illustrates a cross-sectional view of an adhesive deposited on the microring shown in FIGS. 13A-13B that represents an embodiment of the present invention.

Next, an adhesive may be deposited in order to fasten the microring 1302 to the diamond structure 1104 and optically couple the microring 1302 to the color center 1102. The adhesive can be a glue or epoxy. The index of refraction of the adhesive is lower than the semiconductor material used to fabricate the photonic devices. FIG. 14 illustrates a cross-sectional view of an adhesive 1402 deposited over the microring 1302 that represents an embodiment of the present invention. The adhesive 1402 binds the microring 1302 to the diamond structure 1104.

Figure 1A:
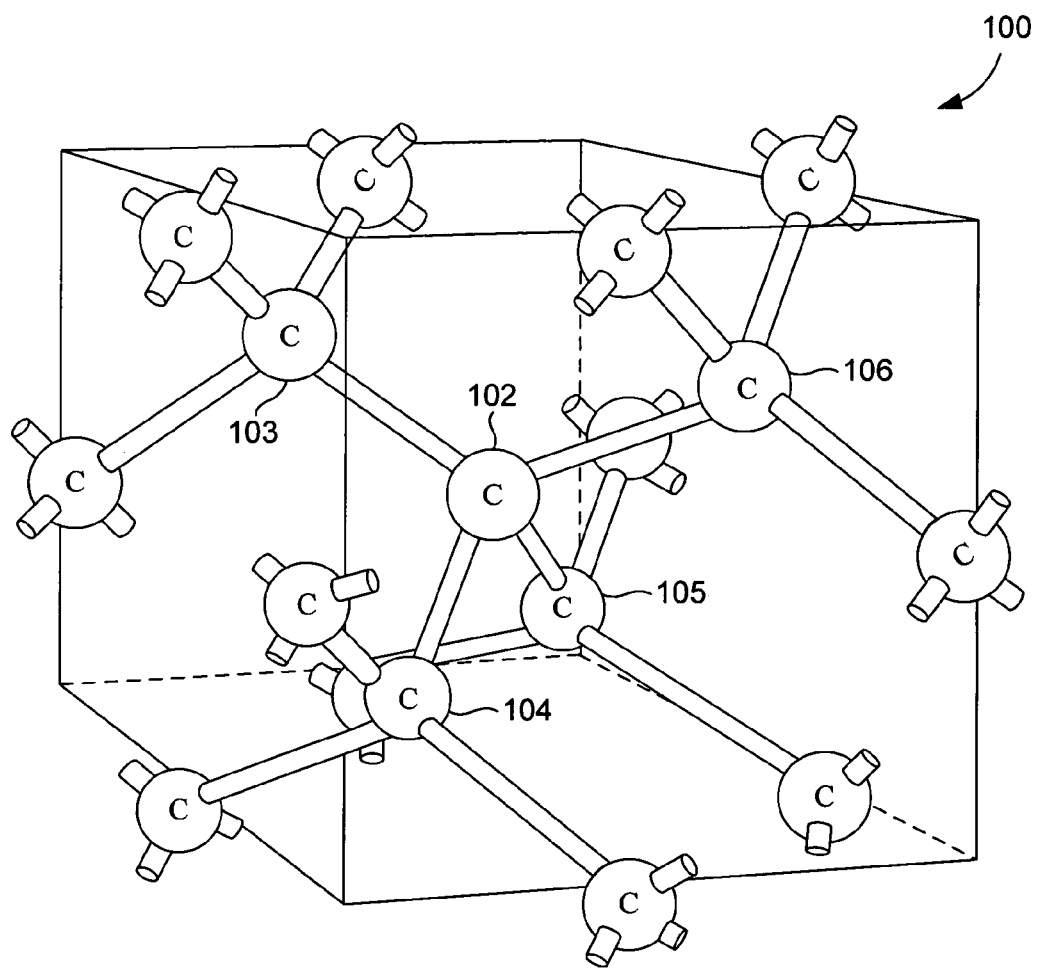
FIG. 1A shows a unit cell of a diamond-crystal lattice.
Figure 1B:
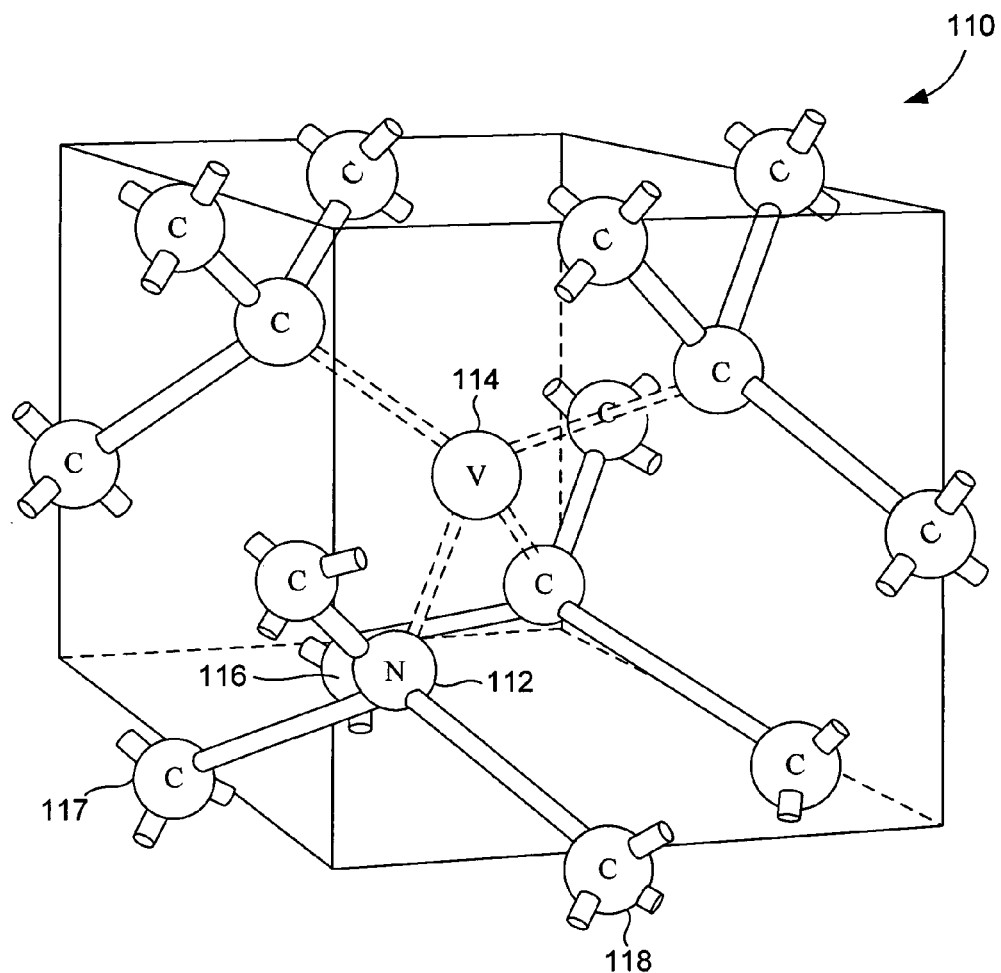
FIG. 1B shows a nitrogen-vacancy center surrounded by a diamond-crystal lattice.
Figure 1C:
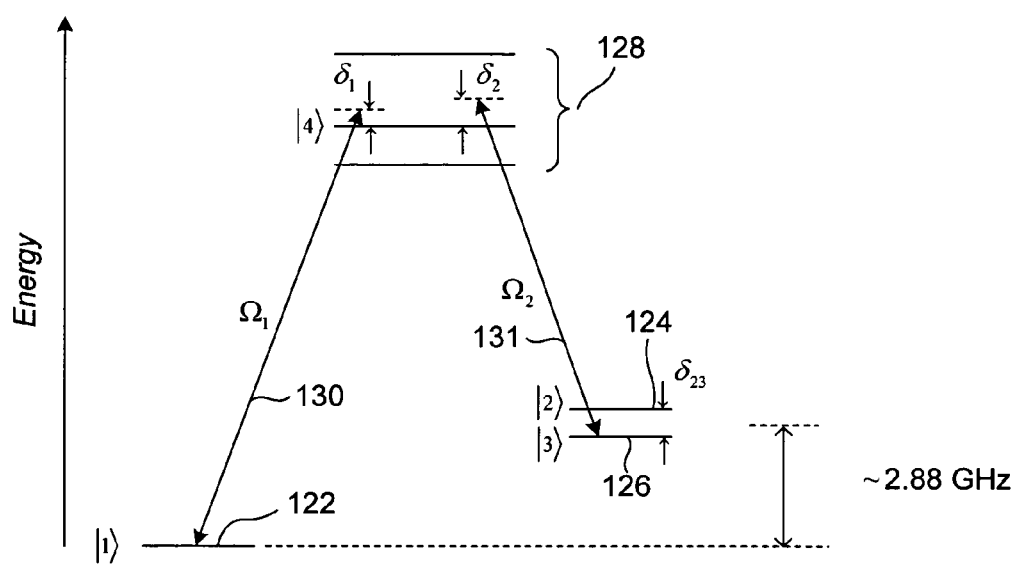
FIG. 1C illustrates an energy-level diagram of a negatively charged nitrogen-vacancy center.

In order to optically couple the photonic devices with the diamond structures, it is necessary that the semiconductor material used to fabricate the photonic devices be transparent to electromagnetic radiation with wavelengths that correspond to transitions of the color center energy levels. For example, the semiconductor GaP can be used to form photonic devices coupled with NV centers, because GaP is transparent to electromagnetic radiation greater than about 570 nm, which includes the wavelengths of electromagnetic radiation associated with the NV center energy level transitions described above with reference to FIG. 1C.

Note that it would be obvious to those of ordinary skill in the art to modify the various method embodiments of the present invention to fabricate a network comprising numerous photonic devices that are coupled to numerous color centers in diamond. For this reason an example quantum computing architecture is described below with reference to FIGS. 15-16 in order to present one of many possible applications of the present invention for fabricating quantum computing devices.

Figure 15:
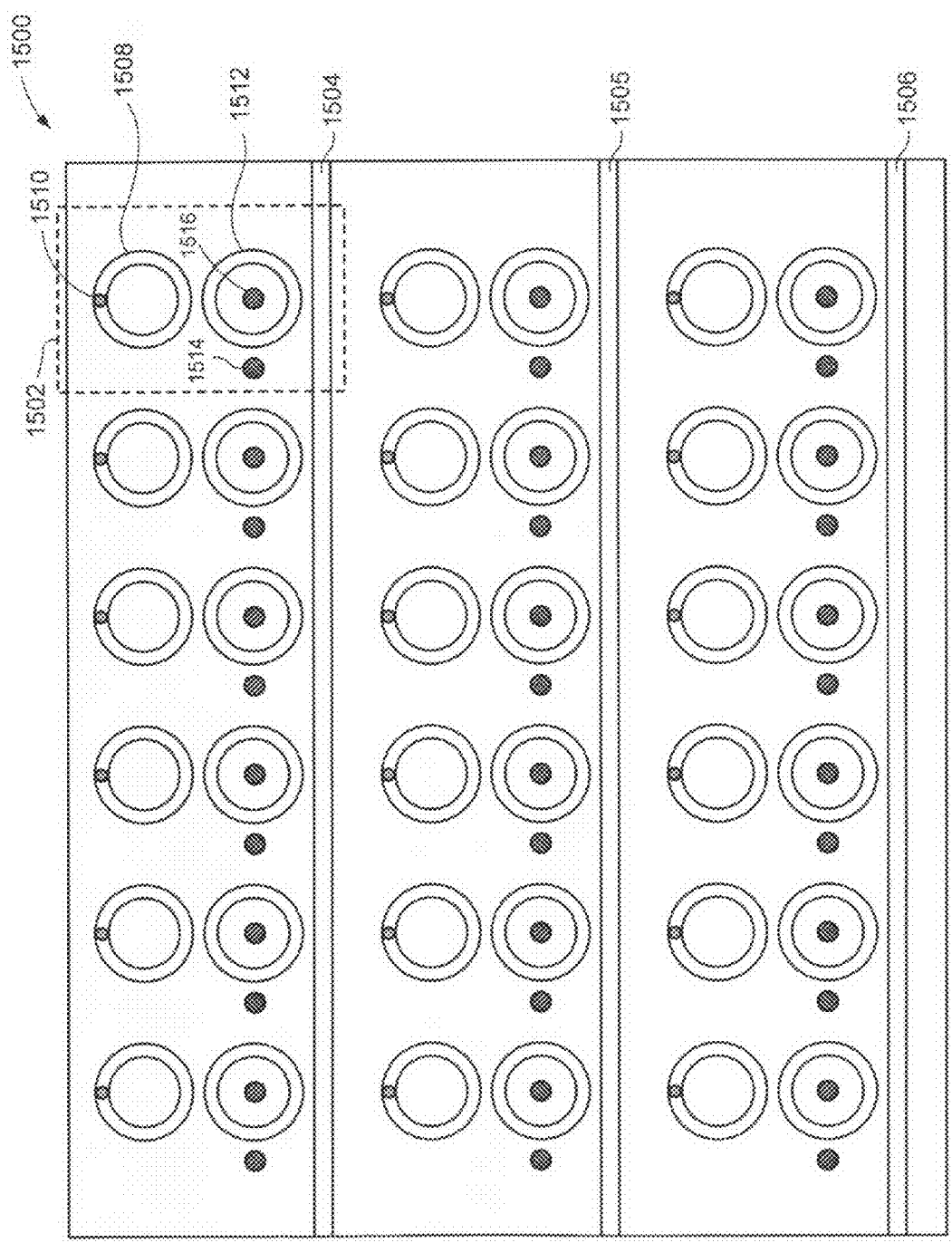
FIG. 15 illustrates an example of a color center-based photonic chip that represents an embodiment of the present invention.

FIG. 15 illustrates an example of a color-center based photonic chip 1500 that represents an embodiment of the present invention. The photonic chip 1500 comprises a photonic network of 18 identically configured nodes, such as node 1502, and 3 bus ridge waveguides 1504-1506 that are formed in a II-VI, a III-V, a Group IV semiconductor or high refractive index dielectric. The photonic chip 1500 is an example of a quantum computing architecture that can be operated as a processor, memory array, or any other device for quantum computing, quantum information processing, and storing quantum information. The node 1502 comprises a first microring 1508 coupled to a color center 1510, and a second microring 1512 which is coupled to a first electrode 1514 and a second electrode 1516. The first microring 1510 transmits electromagnetic waves to and from the color center 1510. Various types of color centers can be used, such as NV centers, or other centers formed from impurities, such as Ni and Si. Each color center can be used to store a quantum bit of information. The bus waveguides 1504-1506 transmit information encoded in electromagnetic waves to, and from, the nodes and can be separately coupled to optical fiber input/ output couplers (not shown). Electrical signal lines (not shown) that extend perpendicular to the chip 1500 surface can transmit current to operate each electrode.

At each node, an electromagnetic wave is transmitted between a bus waveguide and a node color center via evanescent coupling. For example, an electromagnetic wave transmitted along the bus waveguide 1504 can be transmitted by evanescent coupling to the microring 1512. The electromagnetic wave resonates in the microring 1512 and can again be transmitted by evanescent coupling to the microring 1508. When the energy of the electromagnetic wave is large enough, the color center may absorb the energy by undergoing an electronic state change, as described above with reference to FIG. 1C. Also, when the color center 1510 undergoes an electronic state transition, an electromagnetic wave emitted from the color center 1510 can be transmitted from the first microring 1508 to the second microring 1512, and from the second microring 1512 to the bus waveguide 1504 via evanescent coupling.

The dimensions of each microring can be different and/or each microring can be patterned with holes of different arrangements and sizes so that each microring can maintain resonance of an electromagnetic wave of a particular wavelength. As a result, the microring of each node can serve as drop/add filter by extracting an electromagnetic wave of a particular wavelength out of numerous electromagnetic waves transmitted in an adjacent bus waveguide and by placing an electromagnetic wave of a particular wavelength into the adjacent bus waveguide. Tuning microring drop/add structures is well-known in the art. See e.g., Y. Kokubun, *IEICE Trans. Electron.*, E88-C, 349 (2005).

The second microring and the first and second electrodes of each node comprise a switch that can be used to selectively turn each node "on" or "off." For example, each switch can be used to turn "off" a node by changing the second microring resonance frequency. Consider in FIG. 15, a switch comprising the second microring 1512, the first electrode 1514, and the second electrode 1516. An appropriate positive or negative voltage applied between the first electrode 1514 and the second electrode 1516 changes the refractive index of the second microring 1512. By changing the refractive index of the microring 1512, the resonance frequency of the microring 1512 may be shifted away from the absorption and/or emission frequency of the color center 1510. As a result, the color center 1510 and the bus waveguide 1504 are no longer coupled. In an alternate embodiment of the present invention, thermal refractive index tuning can be used to supply heat via the electrodes that changes the refractive index of the coupled microring. In an alternate embodiment of the present invention, electrooptic modulation of the switch microrings can also be used. In an alternate embodiment of the present invention, the photonic chip 1500 may exclude the electrodes coupled to the microrings. Individual nodes can be turned "on" or "off" by changing the refractive index of a switch microring using an incident electromagnetic wave of a particular wavelength.

Figure 16A:
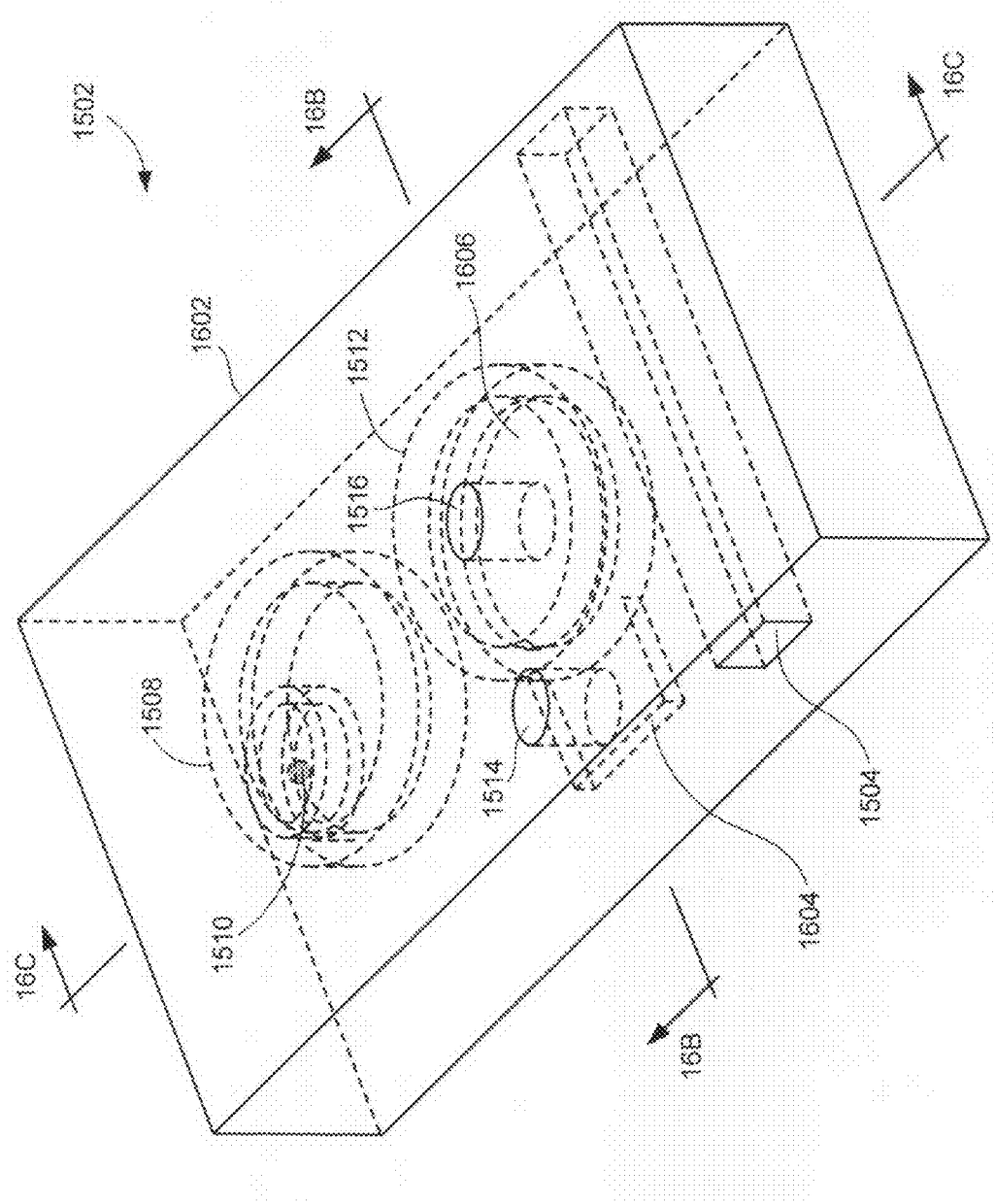
FIGS. 16A-16C illustrates an enlargement of a photonic-chip node of the photonic chip shown in FIG. 15 that represents an embodiment of the present invention.

The first method embodiment of the present invention described above with reference to FIG. 2-10 can be used to fabricate the photonic chip 1500. For example, FIG. 16A illustrates a perspective-view and enlargement of a photonic-chip node 1502 of the photonic chip 1500 that represents an embodiment of the present invention. In the interest of brevity, components of the node 1502 that have been described with reference to FIG. 15 are provided with the same reference numerals and an explanation of their structure and function is not repeated. As shown in FIG. 16A, the photonic devices and the color center 1510 of the node 1502 are embedded in a transparent structure 1602, as described above with reference to FIGS. 2-10. The transmission structure 1602 serves as a cladding layer. The node 1502 also includes a negatively-doped region ("n-region") 1604 and a positively doped region ("p-region") 1606. The first electrode 1514 is located on the top surface of the n-region 1604, and the second electrode 1516 is located on the top surface of the p-region 1606. The n-region 1604 and the p-region 1606 are separated by the intrinsic transmission structure material to form a "p-i-n junction."

Figure 16B:
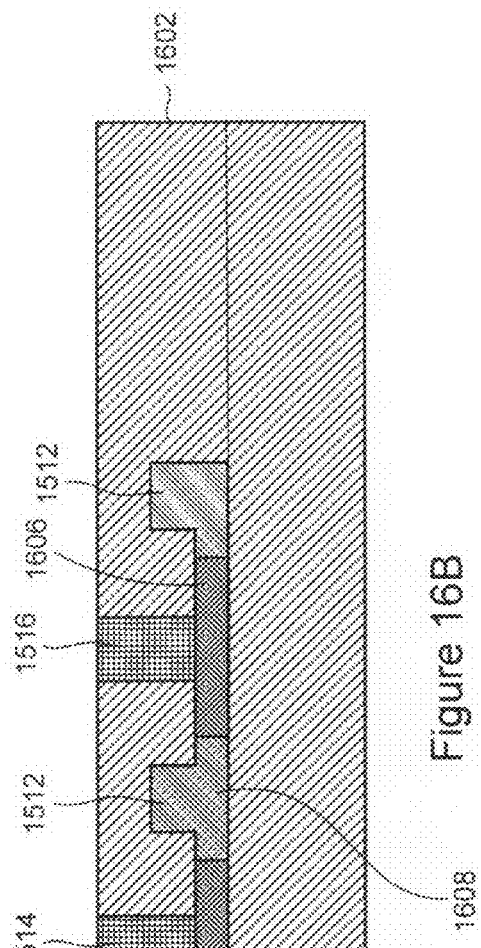
Figure 16C:
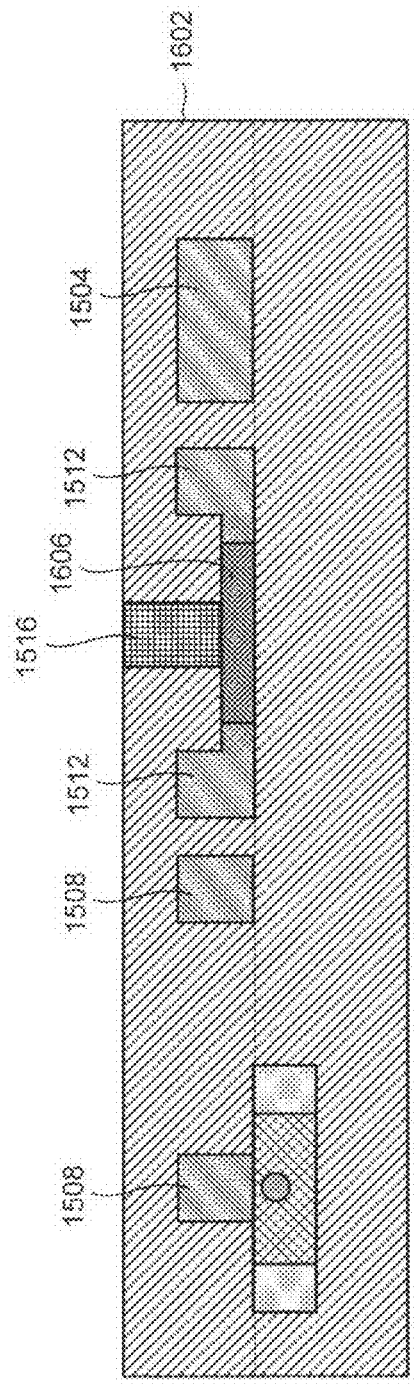

FIG. 16B illustrates a first cross-sectional view of the node 1500 that represents an embodiment of the present invention. As shown in FIG. 16B, the n-region 1604 and the p-region 1606 are separated by intrinsic transmission layer material 1608. FIG. 16C illustrates a second cross-sectional view of the node 1502 that represents an embodiment of the present invention. In FIG. 16C, the color center 1510 is located beneath a portion of the microring 1508.

Although the present invention has been described in terms of particular embodiments, it is not intended that the invention be limited to these embodiments. Modifications within the spirit of the invention will be apparent to those skilled in the art. For example, in alternate embodiments of the present invention, the diamond structure may be in the form of a ridge waveguide, a microring, a microdisk, a photonic crystal. In alternate embodiments of the present invention, the diamond structure may not include color centers. In an alternate embodiment of the present invention, the photonic device can be a two-dimensional photonic crystal that includes resonant cavities coupled to the color centers of the diamond structures or a one-dimensional photonic crystal that include a Fabry-Perot cavity coupled to the color centers of the diamond structures. In alternate embodiments of the present invention SiN can be used for substrate and coating layers, but not the photonic device layers. In alternate embodiments of the present invention, the semiconductor material comprising the photonic devices may include high-index dielectrics, such as $TiO_2$ and SiC. In alternate embodiments of the present, the second method embodiment of the present invention described above with reference to FIGS. 11-14 can be used to fabricate the photonic chip 1500. In alternate embodiments of the present invention, the diamond structure 1104, shown in FIG. 11, can placed in the hole 300 and a photonic device coupled to as described above. In alternate embodiments of the present, the photonic devices, such as microring 1302, described above with reference to FIG. 13A-13B, can be fabricated separately and placed on the surface of the diamond structure 1104.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A method for coupling a photonic device with a diamond structure, the method comprising:
    embedding the diamond structure in a first substrate, the first substrate comprising a first transparent material;
    forming the photonic device in a semiconductor material, the semiconductor material supported by a second substrate;
    forming an intermediate structure by depositing a second transparent material over the photonic device, the second transparent material having substantially the same refractive index as the first transparent material;
    separating the intermediate structure from the second substrate; and
    adhering the intermediated structure to the first substrate so that the photonic device optically couples with the diamond structure.

2. The method of claim 1 wherein the diamond structure further comprises one or more color centers.

3. The method of claim 2 wherein the color center further comprises one of:
    a nitrogen-vacancy center;
    a nickel center;
    a nickel-nitrogen complex center; and
    a silicon-vacancy center.

4. The method of claim 1 wherein the first and the second transparent materials have lower refractive indexes than both the semiconductor layer.

5. The method of claim 1 wherein the first transparent material and the second transparent materials each further comprise one of:
    SiN;
    $SiO_2$;
    SiC;
    acrylate polymers; and
    transparent polymers.

6. The method of claim 1 wherein the semiconductor material further comprises one of:
    AlGaP;
    $TiO_2$;
    SiC;
    a dielectric;
    a II-VI semiconductor;
    a III-V semiconductor; and
    a Group IV semiconductor.

7. The method of claim 1 wherein the photonic device further comprises one of:
    a ridge waveguide;
    a microring;
    a photonic crystal waveguide; and
    a photonic crystal resonant cavity.

8. The method of claim 1 wherein embedding the diamond structure further comprises:
    forming a hole in the first substrate;
    depositing a nucleation center in the hole using nanoimprint lithography; and
    depositing carbon layers over the nucleation center using chemical vapor deposition.

9. The method of claim 8 wherein the nucleation center further comprises one of:
    nickel;
    platinum; or
    a diamond crystal seed having a color center.

10. The method of claim 1 wherein forming the photonic device in the semiconductor material further comprises one of:
    reactive-ion etching;
    focused ion-beam etching;
    chemically assisted ion-beam etching;
    electron beam lithography;
    photolithography; and
    nanoimprint lithography.

11. The method of claim 1 wherein depositing the layer of the second transparent material further comprises one of:
    chemical vapor deposition;
    plasma-enhanced chemical vapor deposition;
    sputtering;
    evaporation;
    molecular beam epitaxy; and
    wafer bonding.

12. The method of claim 1 wherein separating the intermediate layer from the second substrate further comprises one of:
    wet chemical etching;
    reactive-ion etching;
    focused ion-beam etching; and
    chemically assisted ion-beam etching.

13. The method of claim 1 wherein adhering the intermediate layer to the first substrate further comprises gluing, suctioning, grasping, or fusing the second transparent material to the first transparent material.

* * * * *